United States Patent [19]
Medovar et al.

[11] 3,989,091
[45] Nov. 2, 1976

[54] METHOD FOR ELECTROSLAG REMELTING OF TITANIUM OR ITS ALLOYS AND A DEVICE FOR EFFECTING SAME

[76] Inventors: Boris Izrailevich Medovar, bulvar Lesi Ukrainki, 2, kv. 8; Georgy Anatolievich Pavliichuk, Erevanskaya ulitsa, 8, kv. 8; Viktor Mikhailovich Martyn, ulitsa Vernadskogo, 67, kv. 81; Vadim Markovich Maiorenko, bulvar Druzhby Narodov, 8a, kv. 59; Leonid Mikhailovich Stupak, Brest-Litovsky prospekt, 39, kv. 9; Viktor Leonidovich Artamonov, ulitsa Sovskaya, 9, kv. 4, all of Kiev, U.S.S.R.

[22] Filed: June 5, 1972

[21] Appl. No.: 259,821

[30] Foreign Application Priority Data
June 7, 1971   U.S.S.R. .............................. 1660809

[52] U.S. Cl. ................................ 164/252; 75/10 R
[51] Int. Cl.² ........................................ B22D 27/02
[58] Field of Search .............................. 75/10–12; 164/50, 52, 53, 250, 252

[56] References Cited
UNITED STATES PATENTS

| | | | |
|---|---|---|---|
| 3,005,246 | 10/1961 | Murphy | 75/10 R |
| 3,072,982 | 1/1963 | Gordon | 75/10 R |
| 3,389,208 | 6/1968 | Roberts | 164/52 |
| 3,519,059 | 7/1970 | Voskoboinikov | 164/53 |
| 3,547,622 | 12/1970 | Hutchinson | 164/50 |

OTHER PUBLICATIONS

Duckworth & Hoyle, "Electroslag Refining," p. 154, (London: Chapman and Hall, 1969).

*Primary Examiner*—Peter D. Rosenberg
*Attorney, Agent, or Firm*—Holman & Stern

[57] ABSTRACT

A method of electroslag remelting of titanium or its alloys in a mould having a protective atmosphere from inactive gases supplied to the surface of the slag bath and the electrode, as well as into the melt and onto the ingot at the point where it comes out of the mould. Also disclosed is a device for realizing the above method, which device is made as a mould having receptacles disposed at its upper and lower butt-ends and passages provided in the walls in the melting zone and used for supplying inactive gases into the space of the mould.

1 Claim, 1 Drawing Figure

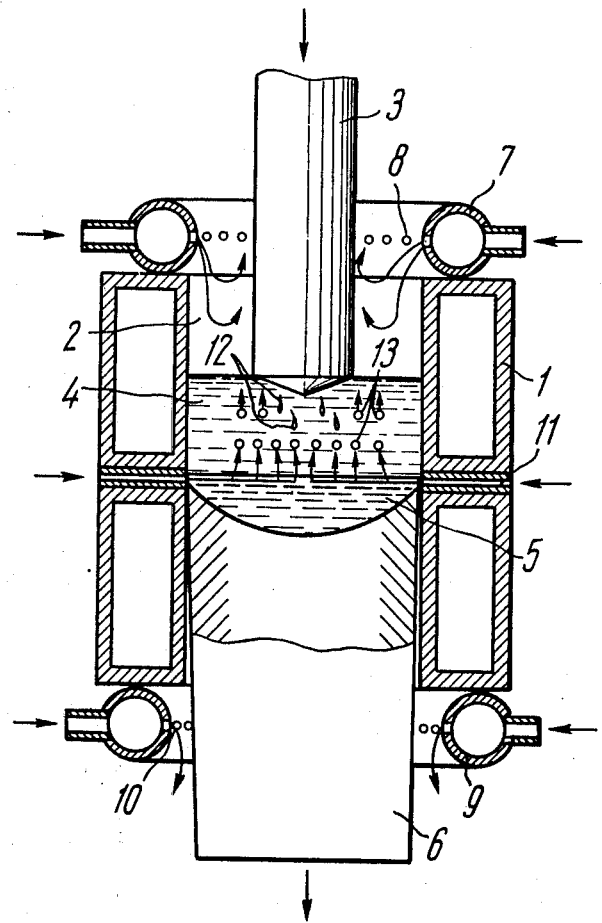

METHOD FOR ELECTROSLAG REMELTING OF TITANIUM OR ITS ALLOYS AND A DEVICE FOR EFFECTING SAME

The present invention relates to electrometallurgy and, more particularly, to methods of electroslag remelting of consumable electrodes from titanium or its alloys, carried out in order to manufacture metal ingots having a predetermined shape in their cross-sections and dimensions, and to devices used for effecting these methods.

A vacuum-arc method of remelting consumable electrodes from titanium or its alloys is widely known, which method is carried out in electric-arc vacuum furnaces by providing a metal bath in the space of a mould forming an ingot from the metal being remelted. This expensive and inefficient process requires expensive equipment. Attempts have been made to effect the electroslag method of remelting titanium in a stationary mould having metal and slag baths and disposed in a hermetically sealed chamber which is first vacuumized and then filled with inactive gases (cf. "Avtomatitcheskaya Svarka", No. 10, 1963, pp. 37–42, published by the Publishing House of the Ukrainian S.S.R. Academy of Sciences, Kiev).

However, this method also turned out to be complicated, and the device used for effecting same is expensive. Employment of simpler conventional devices for electroslag remelting of consumable electrodes made, for instance, from steel and alloys based on iron or nickel is impossible because at high temperatures titanium interacts actively with air components (oxygen, hydrogen, nitrogen), and, as it is well-known, an increased content of oxygen, hydrogen and nitrogen in titanium or its alloys results in much worse mechanical properties of the metal. Such devices are essentially a cooled mould mounted so that it can move in the vertical plane and having tuyeres provided in the walls thereof and used for supplying inactive gas into the melt.

Such moulds cannot be used for electroslag remelting of titanium and its alloys because there is no protective atmosphere in the space of such moulds either at the top where electrodes are melted in the slag bath, or at the bottom where the ingot comes out of the mould, as a result of which air can get into the space of the mould.

Also known in the art are devices for electroslag welding of articles from active metals, in which the heated portions of the metal being welded are protected by an inactive gas. This device is fashioned as two slides mounted at the point at which articles are welded together, and confining alongside with the articles a space for melting the electrodes. These slides are so secured that they can be displaced in the vertical plane, and are provided with passages for supplying inactive gas.

This device cannot be used either for manufacturing ingots from titanium or its alloys.

The main object of the present invention is to develop a method of electroslag remelting of titanium or its alloys, that will be more economical than the conventional methods.

Another object of the present invention is to provide for realization of the above method by using equipment of a simpler design.

In order to realize the above method, one object was to provide a device having such a means for creating a protective atmosphere as to ensure higher efficiency and which will not require complex auxiliary equipment.

These and other objects are accomplished by development of a method of electroslag remelting of titanium or its alloys by way of melting consumable electrodes and provision of slag and metal baths in the mould with protective atmosphere, whereby, according to the present invention, the protective atmosphere is created by way of supplying inactive gas to the surface of the slag bath and electrode, as well as into the melt and onto the ingot at the point where the latter comes out of the mould.

This method is more economical than the vacuum-arc method, and can be realized in a simple somewhat modified conventional device.

It is preferred to supply inactive gas onto the surface of the slag bath in the amount of 2.5 l/min, into the melt in the amount of not less than 0.6 l/kg of molten metal, and onto the surface of the ingot in the amount of not less than 1 l/kg of molten metal.

This amount of the inactive gas is quite sufficient for obtaining high-quality ingots.

The surface of the consumable electrode may be preliminarily coated with a protective layer of aluminium, not less than 0.01 mm thick, which additionally prevents the heated portion of the consumable electrode from interacting with air.

The above method can be realized in the provided device for electroslag remelting of titanium or its alloys, comprising a cooled mould whose walls are provided with passages extending into the melting zone and communicating with the inactive gas source, and which has a drive to effect a relative displacement of said mould and ingot, which, according to the present invention, is equipped with receptacles which are secured on the upper and lower butt-ends of the mould and communicate with the inactive gas source.

This device is simple in design, does not require a complex evacuating system, and provides for a rather high efficiency.

The following description of an exemplary embodiment of the present invention is given with reference to the accompanying drawing showing the device for effecting the present method, a longitudinal section by a vertical plane.

The device is essentially a cooled mould 1 with a space 2 for accommodation and melting of a consumable electrode 3 connected to an electric power supply source (not shown in the drawing).

In the course of the electroslag remelting of the consumable electrode 3 in the space 2 of the mould 1, there is formed a slag bath 4 (slag melt) with a metal bath 5 (metal melt) disposed thereunder and converted into an ingot 6.

In order to supply inactive gas onto the surface of the slag bath 4, a receptacle 7 having outlet openings 8 is mounted on the upper butt-end of the mould 1, a similar receptacle 9 being mounted at the lower butt-end of the mould 1 and also having openings 10 for outlet of inactive gas. The inactive gas is supplied into the zone of the metal bath 5 through passages 11 provided in the walls of the mould 1 and extending into its space 2.

In order to displace vertically the mould 1, provision is made for a drive (not shown in the drawing).

In accordance with another embodiment of the device the ingot 6 may be removed from the stationary mould 1 by means of a crucible provided with a drive (not shown in the drawing).

While realizing the above method the device functions as follows:

Prior to the beginning of the electroslag process the mould 1 is placed on the crucible having a dummy (not shown in the drawing) rigidly secured thereon, the consumable electrode 3 is introduced into the mould 1, and electric current is supplied to the consumable electrode 3 and the crucible. Then, through the receptacles 7 and 9 and the passages 11 inactive gas is supplied to provide a protective atmosphere in the mould 1. Thereupon, slag is poured into the mould 1. When the slag melt 4 touches the lower butt-end of the consumable electrode 3, it starts fusing, as a result of which the ingot 6 starts being formed. As the ingot 6 grows, the mould 1 is moved upwards, or the crucible with the ingot 6 is lowered.

In the course of melting of the consumable electrode 3 drops of molten metal 12, while passing through the slag melt, are treated by the upstream flow of inactive gas 13 supplied through the passages 11 into the metal melt 5, or into the slag melt 4 and the metal melt 5 simultaneously in the amount of not less than 0.6 l/kg of molten metal, the treatment by the inactive gas 13 making it possible to degas the metal and providing for an additional protective atmosphere above the slag bath 4.

In order to provide a protective atmosphere above the surface of the slag bath 4, inactive gas is supplied in the amount of not less than 2.5 l/min. through the openings 8 made in the receptacle 7. In order to prevent atmospheric gases from getting into the gap between the ingot 6 and the inner surface of the mould 1, the ingot 6 is blown-on by the inactive gas supplied through the openings 10 in the receptacle 9 in the amount of not less than 1 l/kg of molten metal.

Tests have shown that the electroslag remelting of titanium and its alloys, carried out in accordance with the present method, makes it possible to manufacture high-quality ingots of an arbitrary shape (round, rectangular, square, etc.) in their cross-sections. The following table presents as an example data on the mechanical properties of technically pure titanium obtained by the afore-described technique, and given in comparison with starting metal.

|  | Temperature, in °C | $\sigma_\beta$ kg/mm$^2$ | $\sigma_{0.2}$ kg/mm$^2$ | $a_H$ kgm/cm$^2$ | $\delta$ % | $\psi$ % |
|---|---|---|---|---|---|---|
| Starting metal | 20 | 35.0 | 23.5 | 28.0 | 45.8 | 76.8 |
| Metal after electroslag remelting | 20 | 34.1 | 23.2 | 28.4 | 49.5 | 77.2 |

What is claimed is:

1. A device for realizing the electroslag remelting of titanium or its alloys, comprising a cooled mould with walls defining a space, said mould having an upper and lower butt-end; a consumable electrode introduced into the space of said mould; passages made in the walls of said mould and designed to supply the inactive gas into the melting zone; a receptacle secured at the upper butt-end of said mould and designed to supply the inactive gas onto the surface of the slag bath; a receptacle secured at the lower butt-end of said mould and designed for supplying the inactive gas onto the ingot at the point where it comes out of said mould; and a drive for effecting relative displacement of said mould and ingot.

* * * * *